(12) United States Patent
Tengler et al.

(10) Patent No.: US 8,321,125 B2
(45) Date of Patent: Nov. 27, 2012

(54) SYSTEM AND METHOD FOR PROVIDING ROUTE GUIDANCE TO A REQUESTING VEHICLE

(75) Inventors: Steven C. Tengler, Grosse Pointe Park, MI (US); Richard A. Johnson, Rochester Hills, MI (US); Gary A. Watkins, Royal Oak, MI (US); Laurence J. Tretyak, Jr., Highland, MI (US)

(73) Assignee: General Motors LLC, Detroit, MI (US)

( * ) Notice: Subject to any disclaimer, the term of this patent is extended or adjusted under 35 U.S.C. 154(b) by 628 days.

(21) Appl. No.: 12/490,746

(22) Filed: Jun. 24, 2009

(65) Prior Publication Data

US 2010/0332113 A1 Dec. 30, 2010

(51) Int. Cl.
*G01C 21/00* (2006.01)
(52) U.S. Cl. ........................................ 701/410
(58) Field of Classification Search .......... 701/123, 701/408, 410, 412, 414–415, 420, 421, 423, 701/428, 430, 431
See application file for complete search history.

(56) References Cited

U.S. PATENT DOCUMENTS

| | | | |
|---|---|---|---|
| 6,424,912 B1 | 7/2002 | Correia et al. | |
| 6,427,119 B1 | 7/2002 | Stefan et al. | |
| 6,507,785 B1 | 1/2003 | Stefan et al. | |
| 6,542,818 B1 | 4/2003 | Oesterling | |
| 6,587,785 B2 | 7/2003 | Jijina et al. | |
| 6,625,538 B2 | 9/2003 | Stefan et al. | |
| 6,640,186 B2 | 10/2003 | Stefan | |
| 6,665,610 B1 | 12/2003 | Correia et al. | |
| 6,701,251 B2 | 3/2004 | Stefan et al. | |
| 6,708,110 B2 | 3/2004 | Stefan et al. | |
| 7,062,379 B2 | 6/2006 | Videtich | |
| 7,155,335 B2 | 12/2006 | Rennels | |
| 7,174,253 B2 | 2/2007 | Videtich | |
| 7,499,798 B2 | 3/2009 | Glaza | |
| 2006/0136122 A1 | 6/2006 | Fraser et al. | |
| 2006/0253248 A1 | 11/2006 | Ames | |

(Continued)

OTHER PUBLICATIONS

Bicego, J., et al., "Method and System for Automatically Updating Traffic Incident Data for In-Vehicle Navigation," filed on Mar. 31, 2008, U.S. Appl. No. 12/059,647.

(Continued)

*Primary Examiner* — Kim T Nguyen
(74) *Attorney, Agent, or Firm* — Ingrassia Fisher & Lorenz, P.C.

(57) ABSTRACT

Systems and methods are disclosed for providing a recommended route, based, in part, on fuel consumption, to a requesting vehicle using data collected from other vehicles. The system includes, but is not limited to, a communication system that is configured to receive vehicle data from a plurality of vehicles. A data storage system is in communication with the communication system and is configured to store the vehicle data as compiled vehicle data. A processor is in communication with the data storage system and the communication system. The processor is configured to utilize the compiled vehicle data to calculate a recommended route that is based, in part, on fuel consumption. The communication system is further configured to transmit the recommended route to the requesting vehicle.

12 Claims, 6 Drawing Sheets

U.S. PATENT DOCUMENTS

| | | |
|---|---|---|
| 2006/0271283 A1 | 11/2006 | Fraser et al. |
| 2006/0291633 A1 | 12/2006 | Glaza et al. |
| 2007/0027614 A1 | 2/2007 | Reeser et al. |
| 2007/0112509 A1* | 5/2007 | Kikuchi et al. .............. 701/209 |
| 2008/0004790 A1 | 1/2008 | Ames |
| 2008/0010011 A1 | 1/2008 | Glaza |
| 2008/0046174 A1 | 2/2008 | Johnson |
| 2008/0114533 A1 | 5/2008 | Weiss et al. |
| 2008/0306682 A1 | 12/2008 | Dorfstatter et al. |
| 2010/0049397 A1* | 2/2010 | Liu et al. .................... 701/33 |

OTHER PUBLICATIONS

Tengler, S. et al., "System and Method for Providing Multiple Portions or a Route in a Telematics System," filed on Jun. 30, 2008, U.S. Appl. No. 12/165,311.

Johnson, R.A. "Method and System to Calculate Historical Traffic Data," filed on Jun. 30, 2008, U.S. Appl. No. 12/165,183.

Johnson, R.A. et al., "Method and System of Using Turn by Turn Server Based Reroutes Data to Improve an Navigation User Interface," filed on Jun. 30, 2008, U.S. Appl. No. 12/165,159.

* cited by examiner

SYSTEM AND METHOD FOR PROVIDING ROUTE GUIDANCE TO A REQUESTING VEHICLE

TECHNICAL FIELD

The technical field generally relates to providing route guidance to a vehicle and more particularly relates to using data collected from multiple vehicles to calculate a recommended route and to provide the recommended route to the vehicle.

BACKGROUND

Vehicle navigation systems calculate travel routes between a starting point and an ending point designated by a vehicle operator. When calculating a travel route, currently available navigations systems present the vehicle operator with the option of selecting between a route covering shortest distance and a route that will take the least amount of time to traverse. Some navigation systems also provide the vehicle operator with the option of selecting between routes that either include or avoid toll roads.

As the price of fuel rises and as concerns over the environmental effects of combusting fossil fuel mounts, vehicle operators are increasingly interested in minimizing their vehicle's fuel consumption. Accordingly, it is desirable to provide a system and method for determining a recommended route that is based, at least in part, on fuel consumption. In addition, it is desirable to provide a system and method that is capable of determining the recommended route based on the vehicle's specific configuration, characteristics and specifications. Furthermore, other desirable features and characteristics will become apparent from the subsequent detailed description and the appended claims, taken in conjunction with the accompanying drawings and the foregoing technical field and background.

SUMMARY

Various examples of a system and method for providing route guidance to a requesting vehicle are disclosed herein. In a first example, a system for providing the route guidance includes, but is not limited to, a communication system that is configured to receive vehicle data from multiple vehicles. A data storage system communicates with the communication system and is configured to store the vehicle data as compiled vehicle data. A processor communicates with both the data storage system and the communication system and is configured to utilize the compiled vehicle data to calculate a recommended route based, in part, on fuel consumption. The communication system is further configured to transmit the recommended route to the requesting vehicle.

In a second example, a system for providing route guidance to a requesting vehicle includes, but is not limited to, multiple vehicle modules that are adapted for attachment to a respective one of a plurality of vehicles. Each vehicle module is configured to automatically transmit vehicle data pertaining to the respective vehicle and is further configured to selectively transmit an interrogation signal. A data center is located remotely from the vehicle modules. The data center is configured to receive the vehicle data and the interrogation signal. The data center is further configured to store the vehicle data as compiled vehicle data, to utilize the compiled vehicle data to calculate a recommended route based, in part, on fuel consumption, and to transmit one of the compiled vehicle data and the recommended route in response to the interrogation signal.

In a third example, a method for providing route guidance to a requesting vehicle comprises the steps of receiving vehicle data from a plurality of vehicles, storing the vehicle data as compiled vehicle data, receiving an interrogation signal from the requesting vehicle, utilizing the compiled vehicle data to calculate a recommended route based, in part, on fuel consumption, and transmitting the recommended route to the individual vehicle.

DESCRIPTION OF THE DRAWINGS

One or more examples will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

Figure 1:
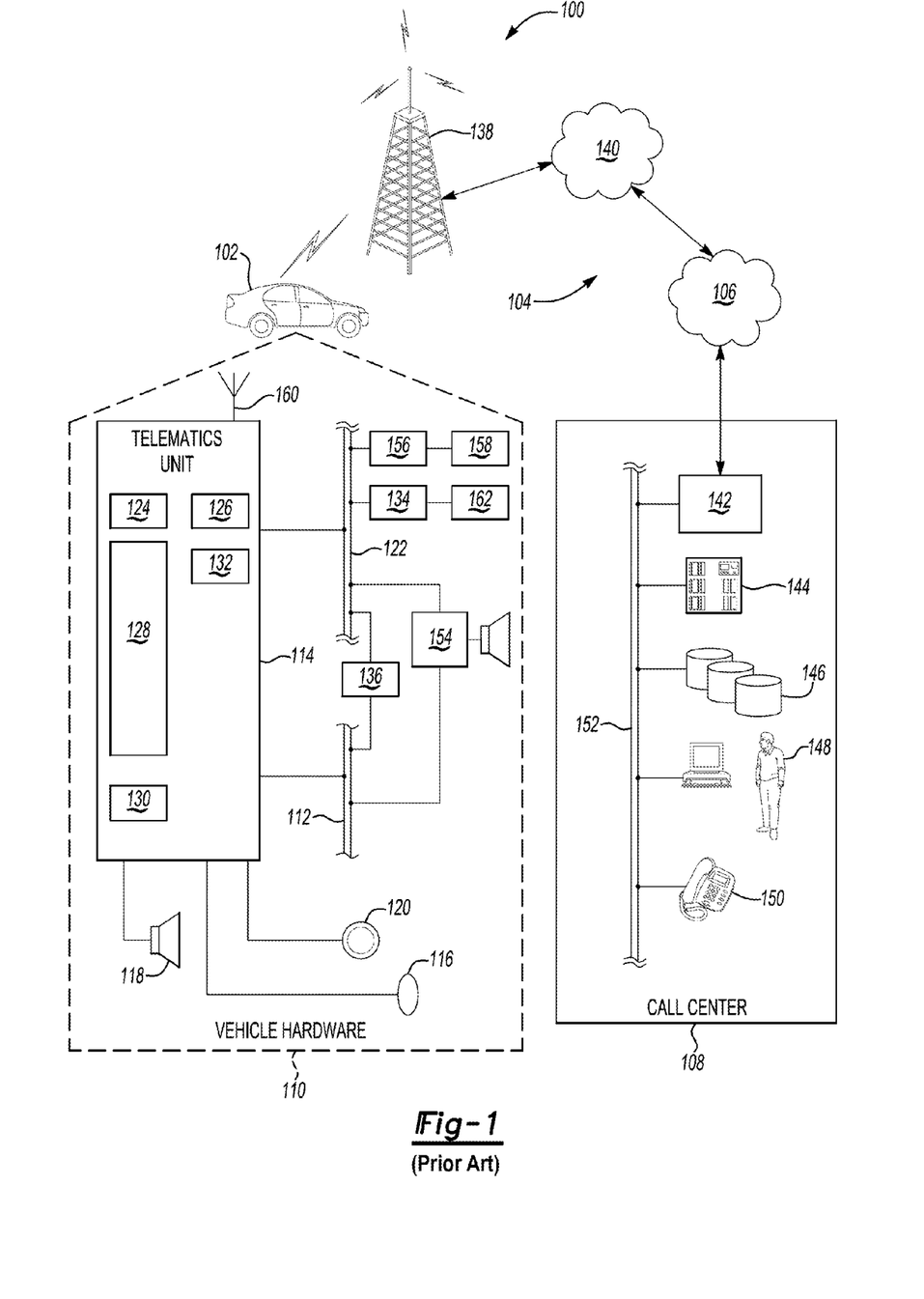
FIG. 1 is a schematic diagram of a prior art system which can be modified to be compatible with the method taught herein.

With respect to FIG. 1, a brief discussion and overview is provided to describe an exemplary system 100 whose overall architecture, setup and operation, as well as individual components are generally known in the art but which may be modified in accordance with the teachings discussed in detail below to be compatible for use with the present method. The system and method taught herein will be discussed in detail after this brief overview of system 100.

System 100 generally includes a vehicle 102, a wireless carrier system 104, a land network 106 and a call center. Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128, one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within electronic processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, videogames and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 will include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push-button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Examples vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless carrier system 104 with land network 106. As appreciated by those skilled in the art, various cell tower/based station/MSC arrangements are possible and could be used with wireless carrier system 104. For example, a base station and a cell tower could be co-located at the same site or they could be remotely located, and a single base station could be coupled to various cell towers or various base stations could be coupled with a single MSC, to list but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier system 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call center 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of computer equipment 150 for demodulation and further signal processing. The computer equipment 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

The foregoing discussion provided a background of at least one system that can be modified to be compatible with the method taught herein. What follows is a detailed discussion addressing the present system and method.

Disclosed herein are a system and a method for presenting a vehicle operator with a recommended route that is based, at least in part, on fuel consumption. In one example, the system includes a plurality of vehicle modules that are embedded or otherwise attached to a respective one of a plurality of vehicles. Each vehicle module is configured to collect vehicle data concerning the respective vehicle with which it is associated. The vehicle data may include, without limitation, geographic information, fuel consumption information, vehicle operational conditions, vehicle specification information (i.e., make, model and configuration) and information regarding external conditions such as, but not limited to, time of day information, date information and prevailing temperature information. Each vehicle module is further configured to transmit the vehicle data to a data center.

The data center may be located remotely from the plurality of vehicle modules and is configured to receive, store and compile the vehicle data from the plurality of vehicles. In this manner, fuel consumption information may be stored for a very large number of vehicles. The compiled vehicle data makes possible the calculation of fuel consumption rates for a variety of differently configured vehicles along specific route segments at varying times, dates and temperatures. The data center is further configured to receive an interrogation signal initiated by a requesting vehicle. When used herein, the term "requesting vehicle" refers to the vehicle sending the interrogation signal and seeking the recommended route, or seeking some other calculated result, from the data center. The data center is further configured to calculate the recommended route in response to the interrogation signal initiated by the requesting vehicle. The interrogation signal may be an electronic or voice communication and may be received directly from the requesting vehicle or may be relayed to the data center through a human advisor or attendant.

In some examples, the data center may determine the recommended route utilizing the compiled vehicle data. As used herein, the term "compiled vehicle data" refers to the compilation of vehicle data received from each vehicle module over time. In other example, the data center may utilize a subset of the compiled vehicle data to calculate the recommended route. For example, if the requesting vehicle is equipped with a hybrid electric power train, the data center may calculate the recommended route using only a subset of the compiled vehicle data that is derived from other vehicles having a hybrid electric power train. In other examples, the compiled vehicle data may be filtered based on other characteristics in common between the requesting vehicle and the plurality of vehicles providing the vehicle data. In still other example, the data center may calculate the recommended route using only compiled vehicle data provided by vehicles that are substantially equivalent to the requesting vehicle (i.e., vehicles of the same make, model, and configuration as the requesting vehicle, or corporate twins of the requesting vehicle). In still other example, driver habits may be considered. Such filtering of compiled vehicle data allows the data center to more accurately assess anticipated fuel consumption by the requesting vehicle.

In some examples, the data center may also consider various road data, such as, but not limited to, roads requiring the payment of a toll, and roads that are undergoing construction. Road data of this sort permits the data center to calculate the least expensive route for the vehicle to travel.

The data center may be configured to transmit the recommended route to the requesting vehicle and the vehicle module may be configured to receive the recommended route from the data center. In other example, rather than transmitting the recommended route, the data center may transmit the compiled vehicle data itself, or some subset thereof, to the requesting vehicle. In such examples, the recommended route calculation is undertaken by a processor onboard the requesting vehicle.

In some instances, the system and method may present the vehicle operator with the greenest route. When used herein, the term "greenest route" refers to the route that will require the vehicle to consume the least amount of fuel as it travels between the starting point and the ending point.

Figure 2:
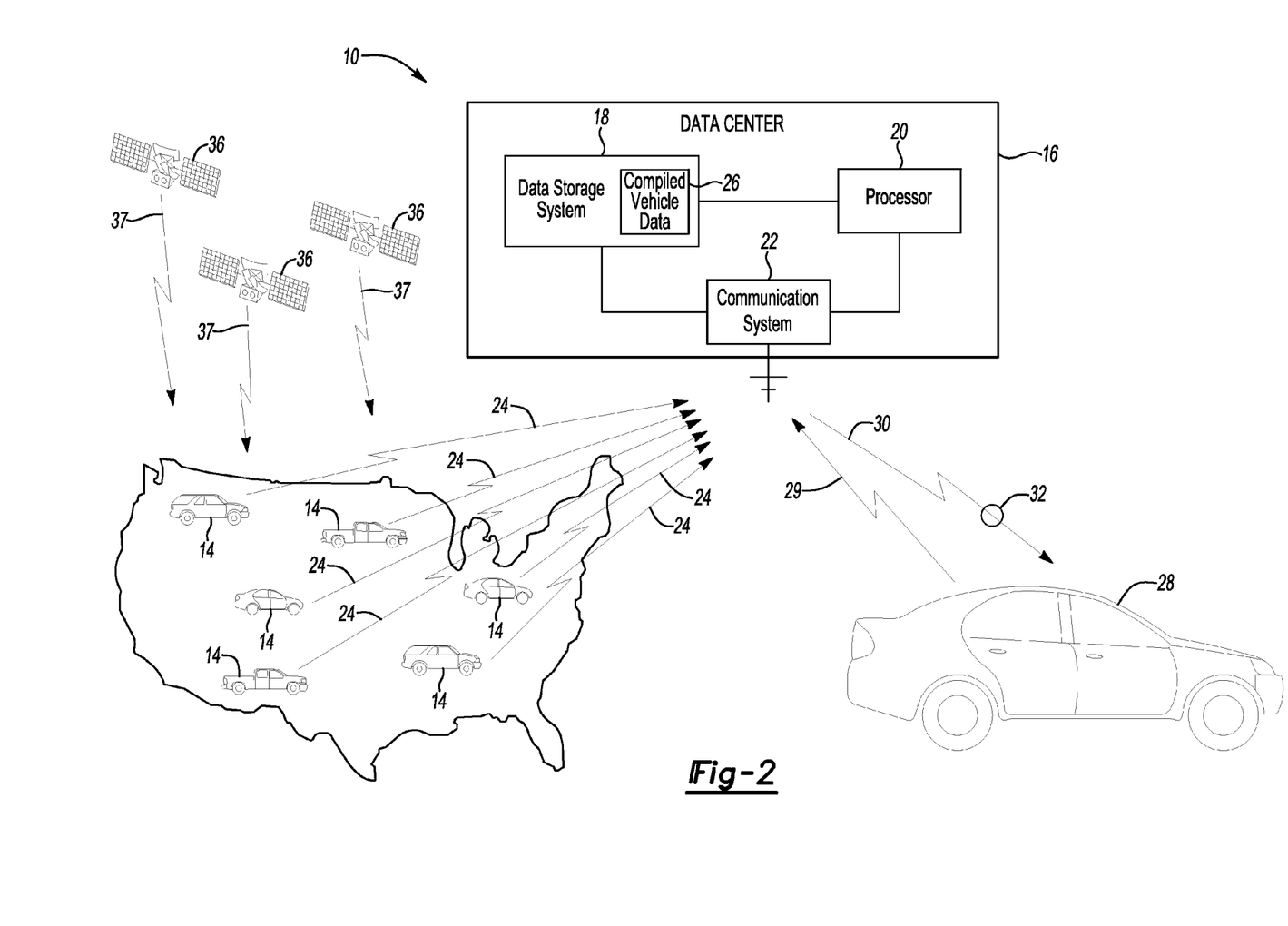
FIG. 2 is a simplified schematic representation of an example system for providing a recommended route to a vehicle based on vehicle data collected from a plurality of other vehicles.

FIG. 2 illustrates a simplified example of a system 10 for providing information to a vehicle. In some examples, system 10 may comprise exemplary system 100, described above. System 10 includes a plurality of vehicle modules 12 (see FIG. 3) configured for attachment to a respective one of a plurality of vehicles 14. The plurality of vehicles 14 are dispersed throughout a geographic region, e.g., throughout the continental United States. While FIG. 2 depicts each vehicle 14 as an automobile, it should be understood that the systems and methods disclosed herein are compatible with all types of vehicles including, but not limited to, aircraft and water craft.

System 10 further includes a data center 16 located remotely from, and in communication with, each vehicle module 12. In some examples, data center 16 may comprise call center 108, described above. As discussed below, vehicle module 12 is configured to transmit signals to, and to receive signals from, data center 16.

Data center 16 includes a data storage system 18, a processor 20, and a communication system 22. In other examples, data center 16 may comprise a plurality of the data storage systems 18, the processors 20 and the communication systems 22. For ease of illustration, data center 16 is depicted as a stand-alone, single purpose facility dedicated to administering the systems and methods disclosed herein. It should be understood that data center 16 may, alternatively, be spread throughout a plurality of buildings or structures which may be either collocated with one another or which may be remote from one another and interconnected through local or wide area networks or otherwise interconnected. Furthermore, data center 16 need not be housed in a single purpose facility but may be housed in a multi-purpose facility.

Vehicle module 12 is configured to engage in communications with data center 16 without involvement by the vehicle operator. In some examples, vehicle module 12 is configured to automatically transmit vehicle data 24 to data center 16 at regular intervals. In other examples, vehicle module 12 may constantly transmit vehicle data 24 whenever vehicle 14 is being operated. In still other examples, vehicle module 12 may transmit vehicle data 24 in response to a request for such data transmitted by data center 16.

Vehicle data 24 comprises information about the respective vehicle 14's operational performance. Data center 16 receives vehicle data 24 from each vehicle module 12 and stores vehicle data 24 as compiled vehicle data 26. Compiled vehicle data 26 accumulates over time as each vehicle module 12 continues to transmit vehicle data 24 to data center 16. In this manner, data center 16 can accumulate a large data base of information concerning vehicle operations and performance.

In the example illustrated in FIG. 2, a requesting vehicle 28 is depicted as both transmitting an interrogation signal 29 to, and receiving a response signal 30, from data center 16. When interrogation signal 29 is received from requesting vehicle 28, data center 16 utilizes compiled vehicle data 26 to calculate a recommended route 32 (e.g. the greenest route) which is, in turn, transmitted to requesting vehicle 28 via response signal 30. In this manner, an individual vehicle such as requesting vehicle 28 can submit a request for information relating to its specific needs and data center 16 can provide a response based on the accumulated experiences of other vehicles.

Figure 3:
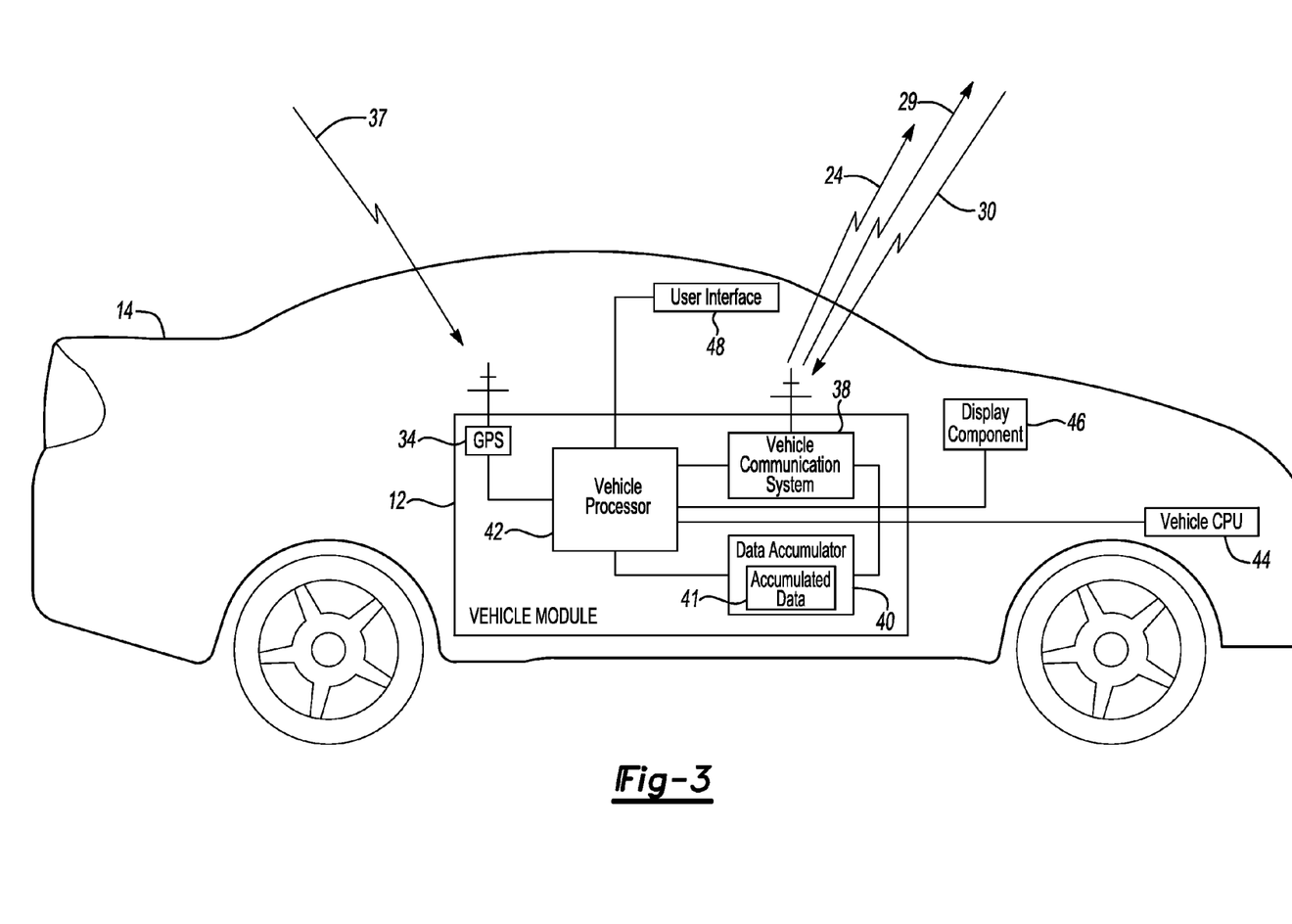
FIG. 3 is a simplified schematic representation of a vehicle equipped with an example vehicle module suitable for use with the system of FIG. 2.

FIG. 3 illustrates an exemplary vehicle 14 equipped with an example of vehicle module 12. In some examples, vehicle module 12 may comprise telematics unit 114, described above. In this illustrated example, vehicle module 12 includes a global positioning system (GPS) component 34 capable of interacting with GPS satellites 36 (see FIG. 2) orbiting the earth. In some examples, GPS component 34 may comprise GPS chipset/component 132, described above. GPS satellites 36 regularly transmit GPS signals 37 towards the earth. GPS component 34 is configured to receive GPS signals 37 and to determine the location of vehicle module 12 on the surface of the earth. This geographic information is correlated with mapping data to enable GPS component 34 to determine the position of vehicle module 12 with respect to known roads.

Vehicle module 12 further includes a vehicle communication system 38 configured to communicate with data center 16. Such communications may include the transmission of vehicle data 24 and interrogation signal 29, and the receipt of response signal 30. In some examples, vehicle communication system 38 comprises a cellular telecommunications system. For example, vehicle communication system 38 may comprise cellular chip set/component 124, described above. In other examples, communication devices other than cellular telecommunications may be employed. For example, and without limitation, an RF transceiver, a WiFi communications device, a satellite communications device, a dedicated short range communications device, or any other type of communications device effective to communicate with data center 16 may be employed without departing from the teachings of the present system.

In still other examples, an intermediate communications hub may be employed to receive vehicle data 24 from vehicle module 12. The intermediate communications hub may include a vehicle dealership that operates a WiFi network to communicate with vehicle module 12. In some examples, the dealership may download vehicle data 24 from the vehicle during the performance of a routine diagnostics examination of vehicle 14.

Vehicle module 12 further includes a data accumulator 40 which may comprise a hard drive, or any other device configured to store vehicle data 24. In some examples, data accumulator 40 may comprise electronic memory 130, described above. Data accumulator 40 may temporarily accumulate vehicle data 24 as accumulated vehicle data 41 and may be employed in examples of vehicle module 12 wherein vehicle data 24 is periodically transmitted to data center 16. In examples of vehicle module 12 wherein vehicle data 24 is continuously transmitted to data center 16, data accumulator 40 may be unnecessary.

Vehicle module 12 further comprises a vehicle processor 42. Vehicle processor 42 may comprise any type of computer, microprocessor or controller. In some examples, vehicle processor 42 may comprise electronic processing device 128, describe above. Vehicle processor 42 is in communication with GPS component 34, vehicle communication system 38 and data accumulator 40 and is configured to control the collection, storage and transmission of vehicle data 24.

Vehicle processor 42 is also in communication with other vehicle components including, but not limited to vehicle CPU 44, display component 46, and user interface 48. Vehicle CPU 44 may collect vehicle information such as distance traveled and fuel consumed by vehicle 14. User interface 48 is configured to allow the driver of vehicle 14 to initiate interrogation signal 29 which may be an electronic signal sent directly to data center 16 or which may be a voice communication to an attendant in communication with, or located at, data center 16. In some examples, user interface 48 may comprise microphone 116 and buttons/controls 120, described above. Vehicle processor 42 may receive the distance and fuel consumption information from vehicle CPU 44. Vehicle processor 42 may further correlate the distance and fuel consumption information with geographic information to determine vehicle 14's fuel consumption rates along specific route segments.

Vehicle processor 42 may direct that such data be transmitted to data center 16 or be stored in data accumulator 40 as accumulated data 41 for later transmission to data center 16. In other examples, vehicle processor 42 may simply control the storage and transmission of geographic information and fuel consumption information, with the correlation of such information occurring at data center 16.

Figure 4:
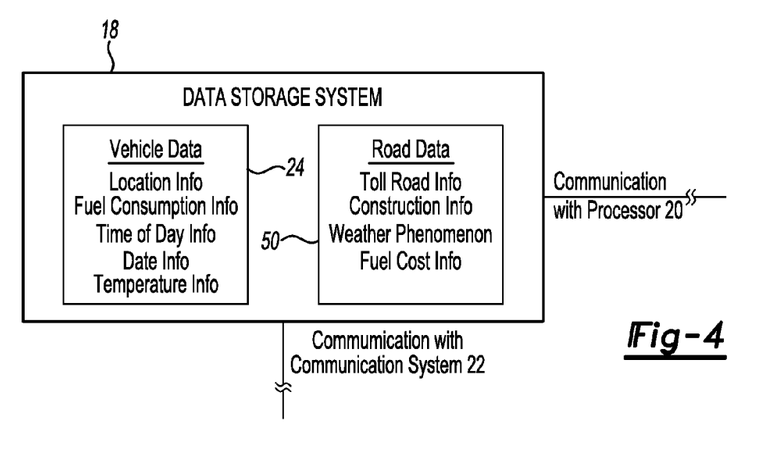
FIG. 4 is a simplified schematic representation of an example data storage system suitable for use with the system of FIG. 2.

FIG. 4 illustrates an example of data storage system 18. Data storage system 18 may comprise a hard drive, a plurality of hard drives, or any other device, mechanism, media, or system configured to store vehicle data 24. In some examples, data storage system 18 may comprise databases 146, described above. Data storage system 18 is in communication with processor 20 and with communication system 22. Data storage system 18 may be configured to contain compiled vehicle data 26. Compiled vehicle data 26 may include geographic information, fuel consumption information, fuel consumption rate information, time of day information, date information, and temperature information. Compiled vehicle data 26 may further include vehicle specification information for each vehicle 14 such as, but not limited to, make, model, engine size, engine type, power train configuration, gross vehicle weight, body style, and vehicle options. Data storage system 18 may further store road data 50. Road data 50 may include, but is not limited to, information relating to the location of toll roads, toll bridges toll tunnels and toll booths. Road data 50 and may also include information such as, but not limited to road construction schedules, weather phenomena, fuel station locations, fuel cost and any other information which may have an impact on fuel consumption and the costs associated therewith. Compiled vehicle data 26 and road data 50 are stored in data storage system 18 until needed by processor 20.

Figure 5:
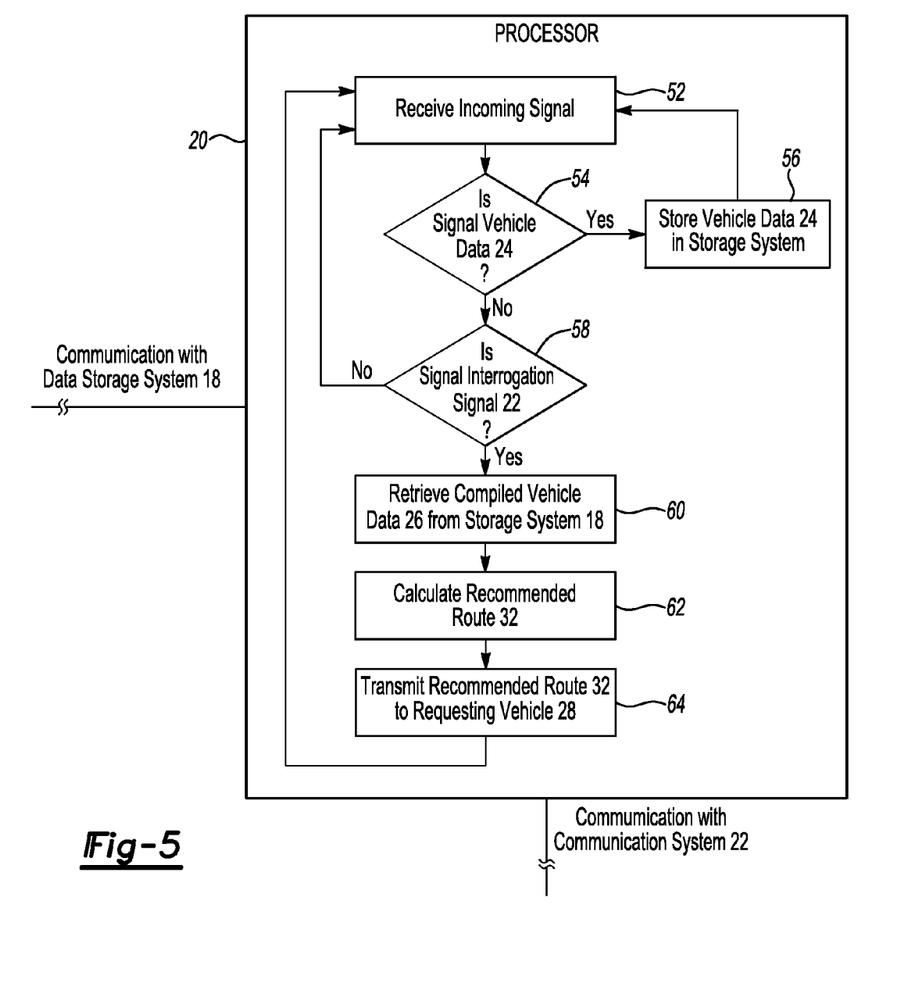
FIG. 5. is a simplified schematic representation of an example processor suitable for use with the system of FIG. 2.

FIG. 5 illustrates an example of processor 20. Processor 20 may comprise any computer, microprocessor, or controller. In some examples, processor 20 may comprise servers 144, describe above. Processor 20 is in communication with data storage system 18 and with communication system 22 and is configured to coordinate the activities of those components. Processor 20 controls the collection of vehicle data 24 and the storage of compiled vehicle data 26. Processor 20 may also be configured to obtain road data 50 from external sources such as, but not limited to, information available over the internet, and to direct the storage of road data in data storage system 18. Processor may further be configured to respond to interrogation signal 29 from requesting vehicle 28 and to calculate recommended route 32.

An exemplary process for receiving signals, including vehicle data 24 and interrogation signal 29, and for responding to those signals is illustrated in FIG. 5. At block 52, processor 20 receives an incoming signal. At block 54, processor 20 determines whether the incoming signal is vehicle data 24. If the incoming signal is vehicle data 24, then at block 56, processor 20 forwards the vehicle data 24 to the data storage system 18 for storage as compiled vehicle data 26. If the incoming signal is not vehicle data 24, then at block 58, the processor 20 determines whether the incoming signal is interrogation signal 29. If the incoming signal is not interrogation signal 29, then the incoming signal may be discarded and processor 20 returns to block 52 to await the next incoming signal.

If the incoming signal is interrogation signal 29, then at block 60, processor 20 retrieves compiled vehicle data 26 from data storage system 18. At block 62, processor 20 calculates the recommended route 32. At block 64, processor 20 controls communication system 22 to transmit recommended route 32 to requesting vehicle 28 and then returns to block 52 to await the next incoming signal.

Figure 6A:
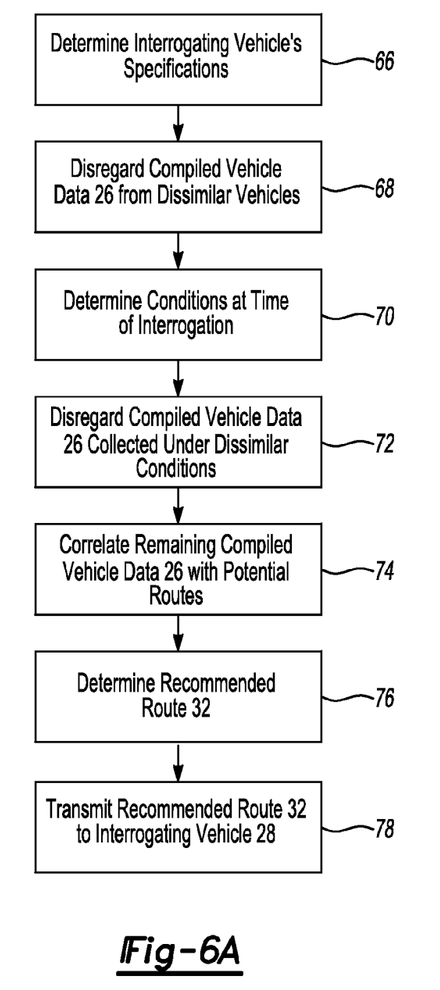
FIG. 6A. is a flow chart that illustrates an example calculation process for determining a recommended route for a requesting vehicle.
Figure 6B:
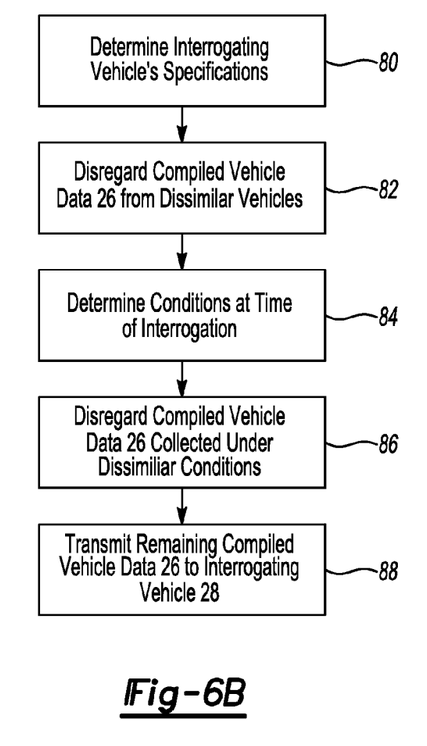
FIG. 6B. is a flow chart that illustrates another example the calculation process of FIG. 5A.

FIGS. 6A and 6B are flow charts illustrating examples of alternate processes undertaken by processor 20 when responding to interrogation signal 29. FIG. 6A illustrates an example of a process for determining the recommended route between a starting point and an ending point. At block 66, processor 20 determines the specifications for requesting vehicle 28. For example, processor 20 may determine that requesting vehicle 28 is a particular make and model vehicle having a hybrid electric power train. At block 68, processor 20 may disregard a portion of compiled vehicle data 26 collected from dissimilar vehicles. At block 70, processor 20 may determine the prevailing external conditions such as the time, date and local weather conditions at the location from which interrogation signal 29 was transmitted. At block 72, processor 20 may disregard a portion of compiled vehicle data 26 collected from vehicles at differing times, dates and weather conditions.

At block 74, processor 20 may correlate the remaining compiled vehicle data 26 for similar vehicles collected under similar time, date and weather conditions, on the one hand, with geographic information, on the other hand. This correlation permits processor 20 to determine historical fuel consumption rates for similar vehicles under similar conditions on roads disposed between the starting point and the ending point. At block 76, processor 20 can determine the recommended route. At block 78, processor 20 can control the communication system 22 to transmit the recommended route to requesting vehicle 28.

In other examples of the process illustrated in FIG. 6A, the recommended route may be determined utilizing all of the compiled vehicle data 26. In still other examples of this process, compiled vehicle data 26 from dissimilar vehicles may be disregarded but compiled vehicle data 26 collected under dissimilar conditions may be considered. In still other examples of this process, compiled vehicle data 26 collected under dissimilar conditions may be disregarded, but compiled vehicle data 26 from dissimilar vehicles may be considered. All permutations and combinations of utilizing the compiled vehicle data are possible.

FIG. 6B illustrates an alternate example of the process depicted in FIG. 6A. The first four steps of the process, shown at blocks 80 through 86, are identical to the steps depicted at blocks 66 through 72, and the associated description is incorporated here by reference. At block 88, processor 20 directs communication system 22 to transmit the remaining compiled vehicle data 26 to requesting vehicle 28. This example requires vehicle processor 42 to use compiled vehicle data 26 to determine the recommended route. In examples where vehicle 14 is equipped with an embedded navigation system, compiled vehicle data 26 may be communicated to the embedded navigation system for determination of the recommended route.

Recommended route 32 may be displayed to an operator in requesting vehicle 28 on display component 46. Display component 46 may be an embedded navigation system, a vehicle radio display, or some other display. In other examples, recommended route 32 may be communicated to an operator in requesting vehicle 28 through audible instructions broadcast through radio speakers, through a dedicated set of loudspeakers, or through some other means effective to communicate audible instructions.

Figure 7:
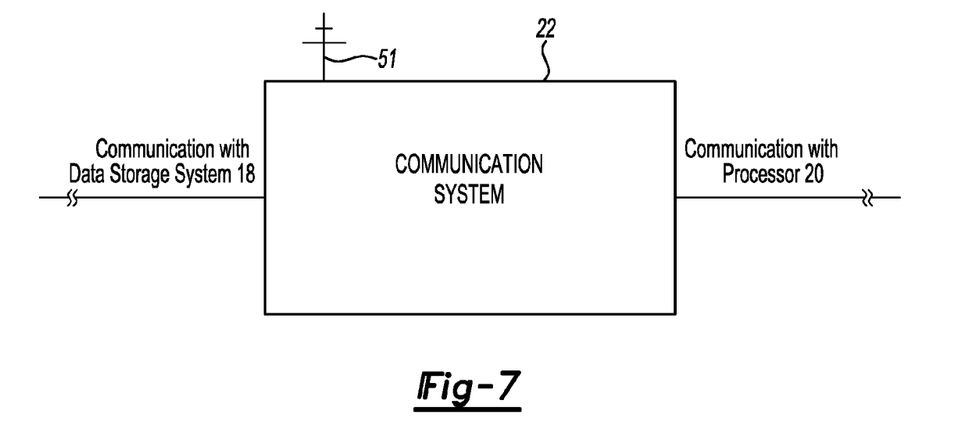
FIG. 7. is a schematic representation of an example communication system suitable for use with the system of FIG. 2.

FIG. 7 is a schematic illustration of communication system 22. Communication system 22 includes an antenna 51 for receiving and transmitting cellular signals. Communication system 22 is in communication with data storage system 18 and with processor 20. Communication system 22 is configured to forward vehicle data 24 received from the plurality of vehicle modules 12 to data storage system 18. Any transceiver configured to transmit and receive signals may be employed with communication system 22. In other examples, a separate transmitter and receiver may be employed. Communication system 22 may comprise a cellular telecommunication system or may comprise any type of transceiver configured to both transmit and receive RF signals. In other examples, microwave communications, satellite communications, and WiFi communication systems may be employed.

Figure 8:
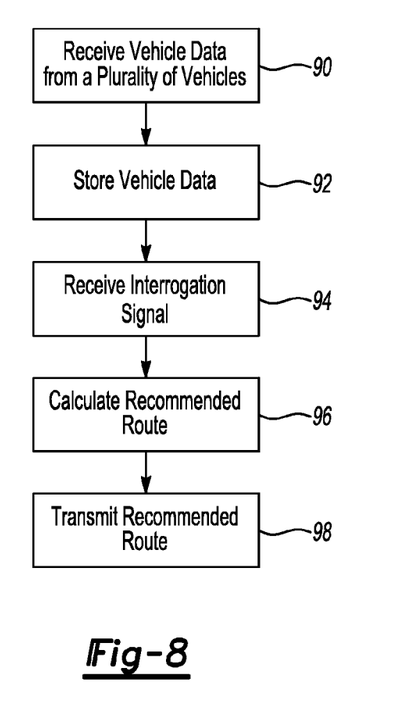
FIG. 8. is a flow chart that illustrates an example method for providing a recommended route to a vehicle based on vehicle data collected from a plurality of other vehicles.

FIG. 8 illustrates an exemplary method for providing information to requesting vehicle 28. At block 90, vehicle data 24 is received at data center 16. At block 92, the vehicle data 24 is stored as compiled vehicle data 26. These first two steps may repeat themselves a plurality of times to provide a constantly increasing and perpetually updated data base of vehicle information. At block 94, data center 16 receives interrogation signal 29 from requesting vehicle 28. At block 96, data center 16 calculates recommended route 32. At block 98, recommended route 32 is transmitted to requesting vehicle 28. Although recommended route 32 has been discussed herein as being based, in part, on fuel consumption, it should be understood that recommended route 32 may comprise any result calculable from data collected from a plurality of vehicles and may be based on any factor or consideration or any combination of factors and considerations including, in addition to, or other than, fuel consumption.

In one exemplary example, requesting vehicle 28 may request recommended route 32 between requesting vehicle 28's current location and a desired destination. When calculating recommended route 32, processor 20 may first determine/identify all or multiple routes that lead from requesting vehicle 28's current location to the desired location. Processor 20 may make this determination by utilizing methods currently employed in conventional navigation systems.

Once a set of possible routes has been identified, processor 20 may retrieve and utilize compiled vehicle data 26 to determine the amount of fuel consumed by the plurality of vehicles 14 as they traveled along each of the possible routes. In some examples, processor may retrieve only a subset of compiled vehicle data 26 to determine the amount of fuel consumed along each of the possible routes. For example, Processor 20 may filter out data derived from dissimilar vehicles and/or data collected at differing times of day and year and may also filter out data collected under dissimilar weather conditions when determining the fuel consumed along the possible routes.

In one implementation, processor 20 may evaluate each segment of road that comprises each of the possible routes. Each individual segment of road (in this context, a segment may include, but need not be limited to, a portion of road between two intersections) can have a fuel consumption value associated with it. The recommended route 32 may comprise a compilation of road segments that add up to the lowest amount of fuel historically consumed.

In other examples, other parameters may be considered by processor 20. For instance, there may be fuel consumption penalties associated with slowing down and stopping when turning from one road segment to another. These fuel consumption penalties and other factors may be considered by processor 20 when determining recommended route 32. Additional considerations may include as a driver's preference for certain scenery, a desire to avoid particular geographic locations or roads, a driver's desire to take the least expensive route, etc. . . . Once recommended route 32 is determined, processor 20 forwards it to requesting vehicle 28 using communication system 22.

While at least one exemplary example has been presented in the foregoing detailed description, it should be appreciated that a vast number of variations exist. It should also be appreciated that the exemplary example or exemplary examples are only examples, and are not intended to limit the scope, applicability, or configuration in any way. Rather, the foregoing detailed description will provide those skilled in the art with a convenient road map for implementing the exemplary example or exemplary examples. It should be understood that various changes can be made in the function and arrangement of elements without departing from the scope as set forth in the appended claims and the legal equivalents thereof.

What is claimed is:

1. A system for providing route guidance to a requesting vehicle, the system comprising:
    a communication system configured to receive vehicle data from a plurality of vehicles;
    a data storage system in communication with the communication system, the data storage system being configured to store the vehicle data as compiled vehicle data; and
    a processor in communication with the data storage system and the communication system, the processor being configured to utilize the compiled vehicle data to calculate a recommended route that is based, in part, on fuel consumption,
    wherein the communication system is further configured to transmit the recommended route to the requesting vehicle.

2. The system of claim 1 wherein the communication system comprises a wireless communication system.

3. The system of claim 1 wherein the communication system comprises a cellular telecommunication system.

4. The system of claim 1 wherein the communication system is further configured to transmit the recommended route to the requesting vehicle in response to an interrogation signal transmitted by the requesting vehicle.

5. The system of claim 1 wherein the processor is further configured to utilize road data to minimize travel expense.

6. The system of claim 1 wherein the recommended route comprises the greenest route.

7. The system of claim 1 wherein the compiled vehicle data comprises geographic information and fuel consumption information and wherein the processor is further configured to calculate the recommended route by correlating the geographic information with the fuel consumption information.

8. The system of claim 7 wherein the compiled vehicle data further comprises time of day information, date information and temperature information and wherein the processor is further configured to calculate the recommended route by correlating the geographic information and the fuel consumption information with the time of day information, the date information and the temperature information and wherein the recommended route comprises a travel route for the requesting vehicle that is optimized for fuel consumption at a time and at a date and at temperature conditions existing when the calculation is performed.

9. The system of claim 1 wherein the processor is further configured to calculate the recommended route utilizing a subset of the compiled vehicle data.

10. The system of claim 1 wherein the processor is further configured to calculate the recommended route using a subset of the compiled vehicle data comprising vehicle data derived from individual vehicles of the plurality of vehicles that have predetermined characteristics in common with the requesting vehicle.

11. The system of claim 1 wherein the processor is further configured to calculate the recommended route using a subset of the compiled vehicle data comprising vehicle data derived from individual vehicles of the plurality of vehicles that are substantially equivalent to the requesting vehicle.

12. A method for providing route guidance to a requesting vehicle, the method comprising the steps of:
    receiving vehicle data from a plurality of vehicles;
    storing the vehicle data as compiled vehicle data;
    receiving an interrogation signal from the requesting vehicle;
    utilizing the compiled vehicle data to calculate a recommended rate based, in part, on fuel consumption; and
    transmitting the recommended route to the requesting vehicle.

* * * * *